United States Patent

Ross

[15] 3,652,161
[45] Mar. 28, 1972

[54] METHOD AND ARRANGEMENT FOR MEASURING DISTANCES OPTICALLY WITH HIGH PRECISION

[72] Inventor: Dieter Ross, Munich, Germany
[73] Assignee: Siemens Aktiengesellschaft, Berlin and Munich, Germany
[22] Filed: Nov. 21, 1968
[21] Appl. No.: 777,676

[30] Foreign Application Priority Data
Dec. 1, 1967    Germany .................P 16 23 564.6

[52] U.S. Cl. .................................356/5, 343/12, 343/14, 332/7.51
[51] Int. Cl. ...........................................G01c 3/08
[58] Field of Search ..............................356/4, 5; 343/12, 14

[56] References Cited

UNITED STATES PATENTS

| | | | |
|---|---|---|---|
| 3,298,024 | 1/1967 | Bohm | 343/12 |
| 3,424,531 | 1/1969 | Bender et al. | 356/4 |
| 3,437,820 | 4/1969 | Thompson, Jr. et al. | 356/5 |
| 3,243,812 | 3/1966 | Williams | 343/12 |

*Primary Examiner*—Rodney D. Bennett, Jr.
*Assistant Examiner*—S. C. Buczinski
*Attorney*—Hill, Sherman, Meroni, Gross & Simpson

[57] ABSTRACT

Apparatus and method for measuring distance in which a coarse measurement of the distance is made by detecting the time of travel of a pulse and a precise measurement is made by using a measuring signal which is relatively short relative to the distance being measured and in which the ambiguity of the number of wave lengths between the direct and reflected wave is resolved by the coarse measurement.

17 Claims, 6 Drawing Figures

3,652,161

METHOD AND ARRANGEMENT FOR MEASURING DISTANCES OPTICALLY WITH HIGH PRECISION

BACKGROUND OF THE INVENTION

1. Field of the Invention

This invention relates in general to measuring apparatus and method such as, for example, in geodetics and construction. For example, distances to be measured may vary from 100 to 3000 meters with a precision of ±2 to 10 cm. although the invention is not to be limited to these particular ranges.

2. Description of the Prior Art

It has been known in the past to transmit a signal to a reflecting body and then to detect the reflected wave at the transmitting point. Apparatus which measures the phase difference between the transmitted and the reflected waves have been known; however, as the frequency of the transmitted signal is increased, the accuracy of measurement is increased. When the frequency of the transmitted wave has a wave length which is less than the distance to be measured, multiple wave lengths will exist between the transmitting and reflecting point, and there will be different points where the transmitted and reflected wave have the same phase relationship. In order to resolve the ambiguity that is caused, measurements may be made at two wave lengths with the first wave length being greater than the distance to be measured as to obtain a rough first measurement and then changing the transmitting frequency to a higher range so that a more accurate measurement may be made. The rough measurement allows the ambiguity to be resolved in the fine measurement.

SUMMARY OF THE INVENTION

The present invention comprises apparatus and method for measuring distances optically with high precision with an inexpensive apparatus wherein a relatively high frequency signal is modulated on an optical carrier, and a coarse measurement of the transit time is obtained by transmitting a sharp pulse.

Although it is possible to measure distance with only the transmission of a pulse, the range of measurement of distance which is necessary in geodetic and construction industries, would require a pulse of 0.1 nsec. and a meter with a counting frequency of at least 10 GHZ would be required. Such equipment would be very expensive.

The present invention is relatively inexpensive in that a coarse measurement of the transit time of a pulse is used to eliminate the ambiguity of the phase relationship between the transmitted and received pulse and that the steepness of the pulse and the counting frequency of the meter may be substantially reduced without destroying the resolution of the measurement.

The measuring signal is modulated upon an optical carrier and is converted immediately in one path and after covering the distance to the reflector and returning is converted in a second path into a lower frequency, and then fed to a counting means over separate paths to obtain precise frequency measurements.

Other objects, features and advantages of the present invention will be readily apparent from the following detailed description of certain preferred embodiments thereof when taken in conjunction with the accompanying drawings.

DESCRIPTION OF THE PREFERRED EMBODIMENTS

Figure 1A:
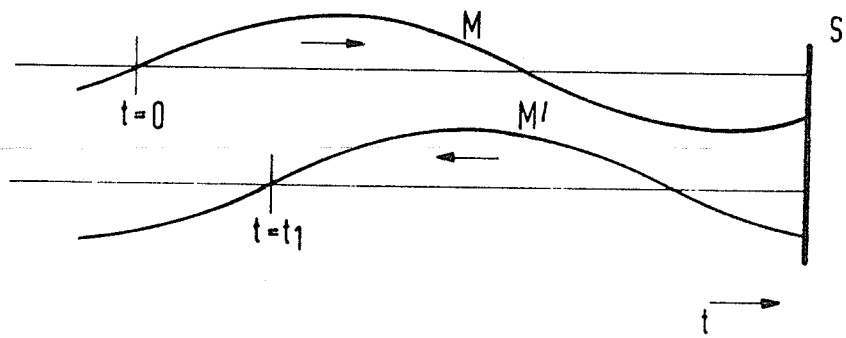
FIG. 1a illustrates schematically the method of measuring distance by phase measurement.
Figure 1B:
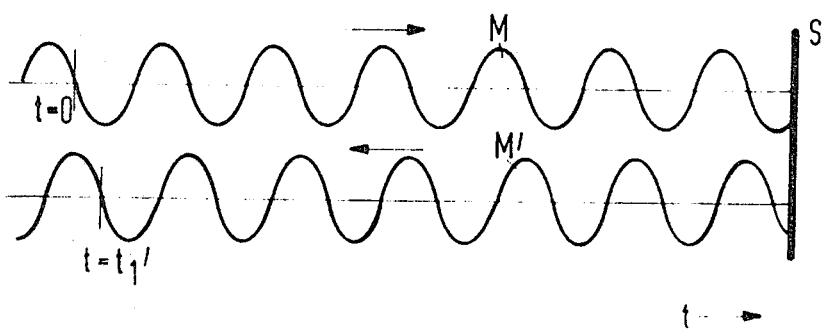
FIG. 1b illustrates schematically the measurement of distance with a higher frequency signal.

FIG. 1 illustrates the method of measuring distance by phase measurement. At a transmitting site a wave M is transmitted toward a mirror S where it is reflected. The incident wave is designated by M and the reflected wave is designated by M'. The phase relationship of the waves M and M' at the transmitting point is an indication of the distance between the transmitting point and the mirror S. The time between the time $t_0$ comprising the zero crossing of the wave M and the zero crossing at $t_1$ determines the distance to the mirror S from the transmitting station. There is no ambiguity in this measurement because the distance between the mirror and the transmitter is less than one wave length of the signal being used. However, since the phase of the signal varies slowly with distance, the accuracy of the measurement utilizing the method of FIG. 1a is not too good. The measurement can be substantially improved by increasing the frequency of the transmitted signal, as shown in FIG. 1b. The accuracy of the measurement between the zero crossing of the wave M at time $t = 0$ and the wave M' at $t = t_1'$ is much greater than in the illustration of FIG. 1a. In FIG. 1b more than six wave lengths of the signal frequency exist between the transmitting point and the mirror S. The ambiguity of the phase relationship in FIG. 1b is resolved by the system according to FIG. 1a in that both the relatively low frequency signal utilized in FIG. 1a and the higher frequency signal utilized in FIG. 1b are transmitted.

Figure 2:
FIG. 2 illustrates schematically the measurement of distance by pulse transmission.

FIG. 2 illustrates another method of measuring distance wherein a pulse is transmitted toward the mirror S and the reflected pulse is detected. The transmitted pulse is illustrated above the indicia $t = 0$ and is associated with an arrow pointing toward the mirror S and the reflected pulse is shown above the indicia $t = t_1$ and is associated with an arrow showing that it is moving away from the mirror S. The time difference $t_1 - t_0$ indicates the distance to the mirror S from the transmitting site and a counter which is turned on at the time $t_0$ and turned off at the time $t_1$ will indicate the distance to the mirror from the transmitting site. This is illustrated by the train of pulses I on the time base $t$.

The present invention utilizes a combination of a multi-wave length transmitted and reflected signal such as illustrated in FIG. 1b in combination with the transmission of a pulse and determining the time that it takes for the echo to return from the mirror S. In other words, the pulse transmission and reception is analogous to the low frequency wave transmitted in FIG. 1a and is used to resolve the phase ambiguity of the signal in FIG. 1b.

So as to substantially reduce the cost of the measuring apparatus, the time scale of the counter may be reduced to the accuracy required for the system.

Figure 3:
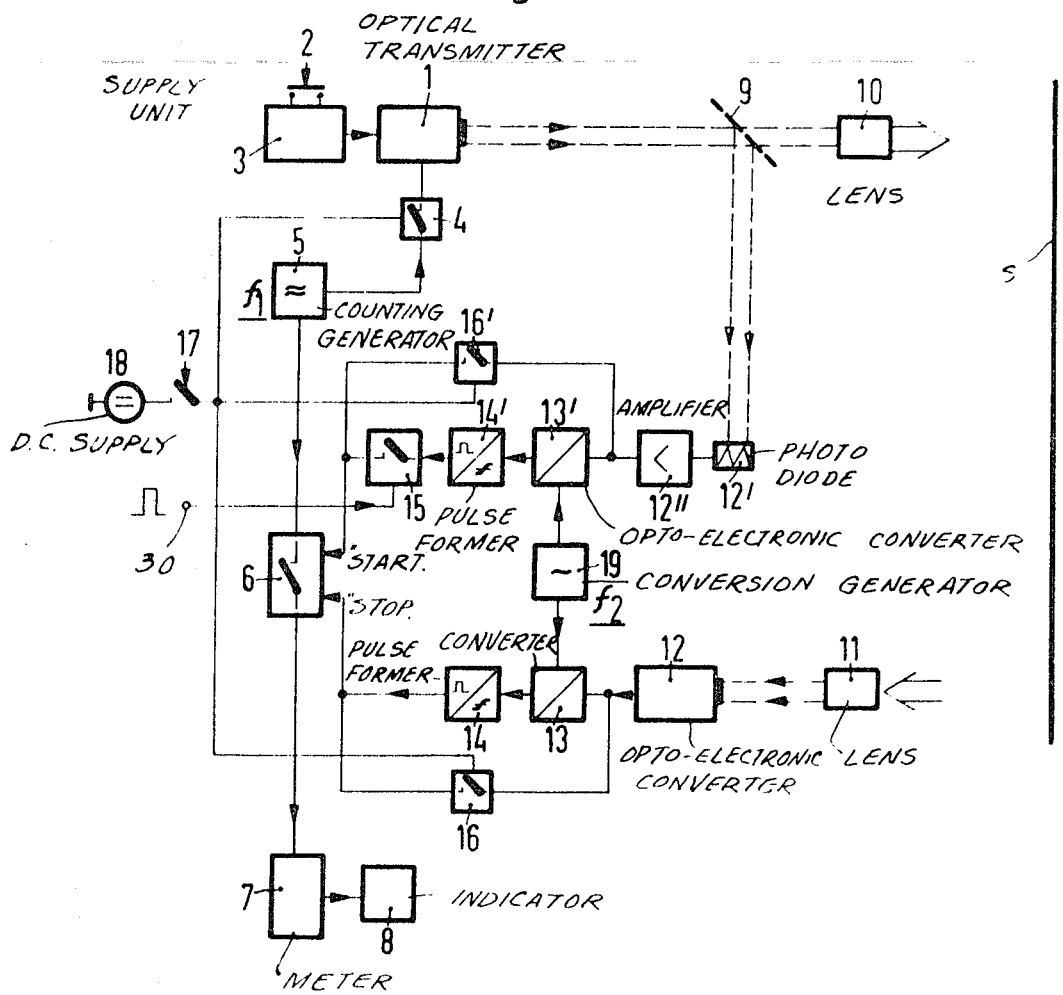
FIG. 3 is a block diagram of a distance meter according to this invention.

FIG. 3 is a block diagram of an optical distance meter according to this invention. An optical transmitter designated by the numeral 1 and which might, for example, be a Laser, is connected to a supply unit 3 that has a key 2. The measuring signal is modulated upon the output of the optical transmitter and is supplied to the modulation input terminal of the transmitter through a switch 4 that passes a signal from the counting generator 5. The output of the counting generator 5 is supplied through a gate circuit 6 to a meter 7 which is connected to an indicator 8.

The output of the optical transmitter 1 passes through a beam divider 9 which diverts part of the signal to a photo diode 12' and the remaining part of the beam passes through the lens system 10. The beam impinges upon the target S which reflects it back to the transmitting site. The target S may be a mirror, for example. The reflected wave passes through a receiving lens 11 which supplies it to an optical electronic converter 12 which amplifies the received signal. The converter 12 supplies an input to converter 13 which supplies an output to the pulse former network 14.

The diverted portion of the beam which supplies the photo diode 12' is connected to an amplifier 12''. An opto-electronic converter 13' is connected to the output of the amplifier 12'' and supplies an input to a pulse former 14'. An electronic switch 15 receives the output of the pulse former 14' and the output of the switch 15 is supplied to the start terminal of the gate circuit 6. The gate 15 has an input terminal 30 which is adapted to receive an energizing pulse.

The output of the pulse former 14 is connected to the stop terminal of the gate circuit 6. A switch 16 is connected in parallel with the converter 13 and the pulse former 14, and a switch 16' is connected in parallel with the converter 13', the pulse former 14' and the switch 15. The control terminals for the switches 16, 16' and 4 are connected through a key switch 17 to a DC supply 18. A conversion generator 19 supplies inputs to the converters 13 and 13'. The frequency $f_2$ of the conversion generator 19 has the relationship to the frequency $f_1$ produced by the counting generator 5 as follows:

$$f2 \leq f1(1-\phi)$$

For example, if it is desired to have a precision of measurement by the phase system it is better by the factor of 1000 than the precision of measurement utilizing the pulse transit time, then $\phi = 10^{-3}$.

With the switches 4, 16 and 16' in the positions shown in FIG. 3, the system is in the "phase measuring" operating position. In this position of the switches, the optical transmitter is modulated by the output of the counting generator 5. The measuring signal is modulated upon the optical carrier by the transmitter 1 and is received by the first channel through the reflector 9 and the diode 12' and the amplifier 12''. The measuring signal is received by the second channel after reflection from the target S at the opto-electronic converter 12. The signals received by both channels are converted by the converters 13 and 13' into a lower frequency by mixing them with the output of the conversion generator 19, and subsequently the control impulses for the gate circuit 6 of the counting installation are derived from the zero crossings. The transmission of impulses occurring at the output of the impulse-forming network 14' of the first channel to the control input "start" of the gate circuit 6 is prevented by the electronic switch 15. In order to make a phase measurement a short time impulse from terminal 30 is fed to the electronic switch 15 which closes switch 15. The electronic pulse supplied to terminal 30 has a time so that only one pulse passes through the switch 15. This closes the gate circuit 6 and connects the output of the counting generator 5 to the input of the meter 7. The meter 7 counts the cycles of the counting generator 5 until the time when the impulse arrives from the output of the impulse circuit 14 of the second channel through the converter 12 which is fed to the stop of the gate circuit 6 and which opens the gate 6, thus disconnecting the counting generator 5 from the meter 7.

When the 17 is closed, the switch 4 is opened and switches 16 and 16' are closed. The measurement system is then in the operating position "for measurement of transit time." The key 2 is used to pulse the transmitter 1. Thus, the transmitted signal will be an individual pulse and the output of the elements 12 and 12'' are supplied directly to the stop and start gates of the electronic switch 6. The meter 7 and indicator 8 will then indicate the distance to the target as measured by the transit time mode of operation.

Figure 4:
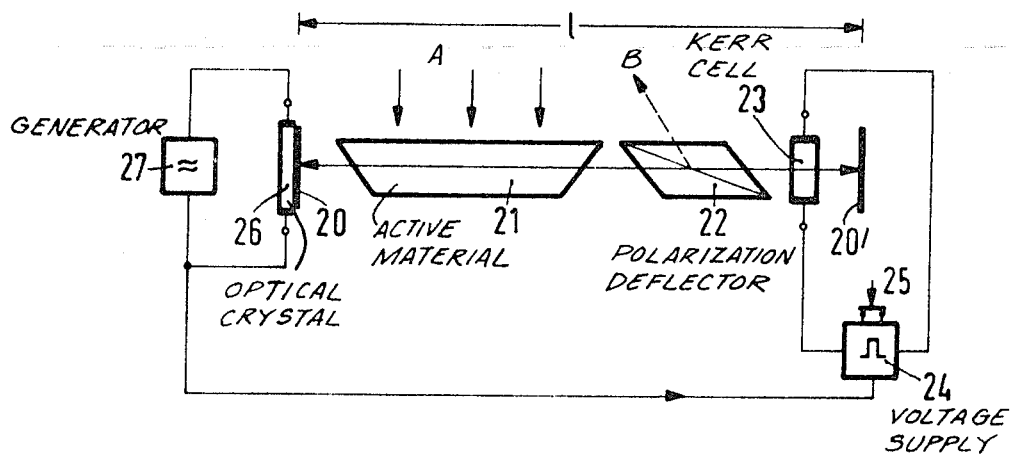
FIG. 4 illustrates a modification of the optical transmitter of the invention.

FIG. 4 illustrates an optical transmitter which may be used as the optical transmitter 1 of FIG. 3. The apparatus of FIG. 4 comprises a Laser which has active material 21 that might be, for example, an active gas mounted in a tubular glass body and which has a modulation system arranged in the optical axis of an optical resonator comprising the mirrors 20 and 20'. The modulation system includes a polarization deflector 22 and a Kerr cell 23. The Kerr cell 23 has a controllable voltage supply 24 connected across its output terminal and the voltage supply 24 may be controlled by the key 25. The energy required for the generation of stimulated emission is identified in FIG. 4 by the arrows A which are shown impinging upon the active material 21. The mirror 20 is mounted adjacent an optical crystal 26 which is stimulated by a generator 27 into mechanical oscillation in the direction of the resonator axis. To obtain linearly polarized radiation the frontal surfaces of the active material 21 are cut so that their angle with the resonator axis is under the so-called Brewster angle.

The Kerr cell 23 rotates the polarization surface as a function of the control voltage applied to its electrode from the voltage supply 24 and when operating in the "phase measurement" mode, part of the stimulated emission which is reflected back and forth between the mirrors 20 and 20' leaves the polarization deflector 22 as shown by the arrow B. The mechanical vibration of the electro-optical crystal 26 changes with the output frequency of the generator 27 and is a function of the distance L between the mirrors 20 and 20'. The period of one oscillation of the generator 27 is selected equal to the single or double travel time of the radiation in the resonator so that the quantities of light reflected by the mirrors will be in phase with the mechanical oscillation of the electro-optical crystal 26 so as to encourage generation of the stimulated emission. In other words, an impulse modulation of the stimulated emission takes place due to the phase coupling and periodic interference caused by the optical resonator.

Figure 5:
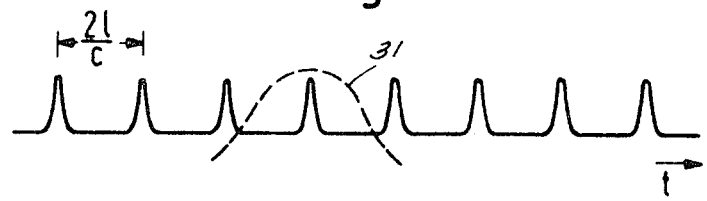
FIG. 5 is a plot of the output of the optical transmitter illustrated in FIG. 4.

FIG. 5 is a plot of periodic light impulses generated by the apparatus of FIG. 4 and the time between pulses is equal to $2l/c$ where $l$ is the distance between the mirrors 20 and 20' and $c$ is the speed of light. This impulse sequence represents a measuring signal of a periodic type which is modulated upon a luminous carrier and can be used as shown in FIG. 3 for measuring distance. When utilizing an optical transmitter according to FIG. 4, an impulse phase measurement may be made in the embodiment according to FIG. 3. Nothing needs to be changed in the circuit structure as explained with the embodiment of FIG. 3, as the impulse sequence according to FIG. 5 can be formed into a sine-shaped measuring wave by lowering the frequency. The generator 27 can therefore be used for the function of the counting generator for the counter or meter according to the generator 4 in FIG. 3.

In order to carry out the measurement of the transit time, it is only necessary to separate an individual impulse from the impulse sequence shown in FIG. 5, by the broken line 31. In the embodiment illustrated in FIG. 4, this may be done, in that the Kerr cell 23 in the operating position for measurement of running time receives no control voltage, and impulse stimulated emission is not rotated when passing through the Kerr cell, and thus no uncoupling takes place via the polarization deflector 22. The uncoupling of an individual impulse from the resonator can then be caused by merely applying a control voltage for a short time to the electrodes of the Kerr cell 23. The controllable voltage supply 24 has a trigger means synchronized with the generator 27, which releases such a control voltage impulse upon depression of the key 25.

The arrangement of FIG. 4 has the advantage, in that the switching speed of the Kerr cell need only be within the size order of the impulse distance $2l/c$ to assure that sufficiently steep pulses for measuring the transit time will be obtained automatically from the Laser.

The invention comprises a combination which obtains a coarse measurement by utilizing the transit time of a single impulse so as to resolve the ambiguity between the second measurement made with a higher frequency signal utilizing phase measurement. The invention reduces the requirement for steepness of the reading and trailing edge of the pulse, and also reduces the counting frequency of the meter. The invention also allows the same counting apparatus to be used for the phase measurement and measurement of the transit time.

The apparatus also operates particularly favorable when the measuring signal modulated upon the optical carrier is converted immediately after being received in one channel and after passing twice through the measuring path in the other channel. The factor for frequency conversion is related to the precision of the measurement required.

The invention allows an optical transmitter to be used for the individual pulse transmission and reception and also for continuous transmission of a wave for the phase measurement. The first channel of the opto-electronic receiver is used for producing a start signal for the counter, and the second channel is used to produce a stop signal for the counter. It is sometimes expedient to supply the measuring signal directly to the first channel of the opto-electronic receiver from the output of the optical transmitter.

With the square mixture of a first signal of the form $A \cdot \cos \omega_1 t$ with a signal of the form $A \cdot \cos \omega_2 t$ there result $$A^2 (\cos \omega_1 t + \cos \omega_2 t)^2 \quad (1)$$

a frequency component results which has the difference of $\omega_1 - \omega_2$ or $$A^2 \cos(\omega_1 - \omega_2)t. \quad (2)$$

Also, mixing a first signal of this form $$A \cdot \cos (\omega_1 t + \phi)$$

with the signal of the form $$A \cdot \cos \omega_2 t$$

in a square mixer produces the output $$[A^2 \cos (\omega_1 t + \phi) + \cos \omega_2 t]^2 \quad (3)$$

which has a frequency component of $\omega_1 - \omega_2$ and $$[A^2 \cos (\omega_1 - \omega_2)t + \phi] \quad (4)$$

A comparison between equation 2 and equation 4 indicates that both equations differ from each other merely by a phase shift through the angle $\phi$.

This means that the phase difference is maintained in the multi-phase measurement when the measurement signal is received directly from the output of the optical transmitter and the measuring signal is received after passing through the measurement path and delayed in its phase relationship has been converted into a lower frequency by using a local oscillator. Thus, it is possible to adjust the counting speed of the meter and the counting frequency of the generator feeding the meter to the measuring precision of the rough measurement of the transit time, because the adjustment of the counting apparatus can be accomplished by beating down the measurement signal in both channels of the opto-electronic receiver.

When making the measurement of the transit time of the pulse, neither the converters nor the impulse forming networks are required, and it is feasible to break both channels between the input of the converters and their outputs are connected to the control of the counting means for measuring the transit time.

A conversion generator with a frequency $f_2$ which satisfies the equation is satisfactory $$f_2 \leq f_1 (1 - \phi)$$

where $\phi$ represents the relation of the measurement precision required at measuring the transit time relative to the measurement precision required for the phase measurement.

The optical transmitter 1 illustrated in FIG. 3 may be a luminescent diode which has a relatively high life and also when pulsed produces high peak performance. Instead of a luminescence diode a Laser may also be used which produces high output and coherence of the radiation.

The optical transmitter may also comprise a Laser for measuring the transit time and a luminescence diode for the phase measurement having a ray direction adjusted collinearly to the Laser diode. A combining effect can be achieved as the high clustering and peak performance of the Laser makes possible a quick and simple alignment of the collinearly adjusted radiation of the luminescence diode.

The optical transmitter may also be a gas Laser which has relatively high transmission performance. A Laser, such as a gas Laser, may also be equipped for impulse modulation using the principle of phase coupling of its emission. The periodic sequence of impulses may be used as a measurement signal modulated upon an optical carrier and be used for phase measurement in the same manner that a sine-shaped measurement signal is modulated upon an optical carrier. For this embodiment, a modulation installation usable as a gate circuit, is connected to the Laser for separating individual pulses to measure the transit time.

Although various minor modifications might be suggested by those versed in the art, it should be understood that I wish to embody within the scope of the patent warranted hereon all such modifications as reasonably and properly come within the scope of my contribution to the art.

I claim:

1. A method for measuring distances between a measuring site and a target optically with high precision whereby the desired precision of the result of the measurement is obtained by transmitting a measurement signal upon an optical carrier wave which has a plurality of wave lengths that are reflected from the target and wherein the phase ambiguity is resolved by transmitting periodically a single optical pulse and determining the transit time to the target and return of such periodically transmitted pulse and whereby a common counting device is used for making the phase measurement and determining the transit time and wherein said single optical pulse and said measurement signal upon an optical carrier wave are transmitted on a time sequential basis.

2. A method according to claim 1, whereby a measurement signal is produced by a counting oscillator and is modulated upon the optical carrier and after being received is converted immediately in one channel and in a second channel after passing through the measuring path twice to a lower frequency, the outputs of the one and second channels supplied to said counting device for evaluation, and whereby the frequency conversion is selected to maintain a desirable relationship between the measurement of the transit time and the phase measurement.

3. A method according to claim 1 comprising an optical transmitter modulated by the measuring signal and an opto-electronic receiver with a counting device in which the modulation means of the optical transmitter is designed for modulating with a periodic modulation and for individual impulse control, the opto-electrical receiver having a first channel receiving the measurement signal before transmission and a second channel receiving the measuring signal after it has twice passed through the measuring path, said first channel with its output connected to the first control input of the counting device, and the second channel with its output connected to a second control input of the counting device.

4. A method according to claim 3, whereby the measuring signal received from the output of the optical transmitter is fed directly to the first channel of the opto-electronic receiver.

5. A method according to claim 4, whereby at least the second channel includes an opto-electrical converter, a frequency converter connected to said opto-electrical converter, a pulse former connected to said opto-electrical converter and designed for the producing of a control impulse from the zero passage of the measurement signal converted downwardly in frequency.

6. A method according to claim 5, whereby an electronic switch is mounted in the path of the first channel of the opto-electronic receiver behind the impulse-forming network.

7. A method according to claim 6, whereby both channels have their outputs connected to control terminals of the counting device for measuring the transit time, and a pair of shorting switches in parallel with portions of said channels.

8. A method according to claim 7, whereby the counting oscillator with a frequency $f_1$ is connected to the counting device, a start-stop switch connected between the counting device and the counting oscillator, and whereby for downward conversion of the signal received by the opto-electronic receiver in both channels a conversion generator has a frequency $f_2$ which satisfies the equation $$f_2 \leq f_1 (1 - \phi)$$

whereby $\phi$ represents the relation of the measurement precision to be required for measuring the transit time to the measurement precision required for phase measurement.

9. A method according to claim 8 whereby for "start" and "stop" of the counting device the start-stop switch is controlled by outputs of the one and second channel.

10. The method according to claim 9 whereby the optical transmitter is a luminescence device.

11. The method according to claim 9 whereby the optical transmitter is a Laser.

12. The method according to claim 9 whereby the optical transmitter consists of the combination of a Laser for measuring the transit time and a luminescence device for the phase measurement.

13. The method according to claim 9 whereby the optical transmitter is a gas Laser.

14. The method according to claim 13 whereby the optical transmitter comprises a gas Laser and is equipped with means for impulse modulation by using the principle of phase coupling of its emission, and an additional modulation installation operative as a gate circuit connected to said Laser for separating individual impulses from the impulse sequence for making the measurement of the transit time.

15. The method according to claim 14, whereby the installation for impulse modulation comprises an electro-optical crystal, one of the two resonator mirrors of the Laser is fastened to the electro-optical crystal, a generator is connected to the crystal to stimulate it into mechanical oscillations to periodically change the resonator length of the Laser, and whereby the period of the oscillation of this generator is selected equal to the single or double transit time of the emission within the resonator.

16. Distance measuring means comprising:
   means for transmitting and receiving optical energy from a reflector;
   means for modulating said optical energy;
   a pair of channels in said transmitting and receiving means;
   a first one of said channels receiving a portion of the transmitted energy;
   the second channel receiving optical energy from said reflector, a counting generator modulating said means for transmitting;
   a start-stop gate receiving an output from said counting generator and connected to the outputs of said pair of channels;
   a distance meter connected to said start-stop gate;
   switch means for disconnecting said counting generator from said transmitting means;
   pulsing means connected to said transmitting means to transmit a pulse when said counting generator is disconnected from said transmitting means, and said start-stop gate receiving said pulse when transmitted and also receiving the pulse after reflection from said reflector.

17. Apparatus according to claim 16 wherein each of said channels comprise opto-electronic converters, and pulse formers, a pulse switch connected in the first channel, and a pair of shorting switches connected in parallel with portions of the first and second channels.

* * * * *